United States Patent
Mortun

(10) Patent No.: US 9,301,358 B2
(45) Date of Patent: Mar. 29, 2016

(54) WALL SWITCH WITH NIGHTLIGHT

(71) Applicant: HUBBELL INCORPORATED, Shelton, CT (US)

(72) Inventor: Sorin Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/206,679

(22) Filed: Mar. 12, 2014

(65) Prior Publication Data

US 2014/0265883 A1  Sep. 18, 2014

Related U.S. Application Data

(60) Provisional application No. 61/781,589, filed on Mar. 14, 2013.

(51) Int. Cl.
*H05B 37/02* (2006.01)
*H05B 33/08* (2006.01)

(52) U.S. Cl.
CPC ........ *H05B 33/0842* (2013.01); *H05B 37/0209* (2013.01); *H05B 37/0218* (2013.01); *Y02B 20/46* (2013.01)

(58) Field of Classification Search
CPC ................................ H05B 37/02; H01H 13/02
USPC ................. 315/129–132, 136, 158, 294, 362; 362/95; 200/310, 315, 317
See application file for complete search history.

(56) References Cited

U.S. PATENT DOCUMENTS

| | | | |
|---|---|---|---|
| 2,612,597 A | 9/1952 | Sherrard | |
| 3,084,239 A | 4/1963 | Horvath et al. | |
| 4,038,582 A * | 7/1977 | Horwinski | 315/129 |
| 5,670,776 A * | 9/1997 | Rothbaum | 250/214 AL |
| 6,805,469 B1 | 10/2004 | Barton | |
| 7,118,235 B2 | 10/2006 | Barton | |
| 7,165,864 B2 | 1/2007 | Miller | |
| 7,234,844 B2 | 6/2007 | Bolta et al. | |
| 7,285,721 B1 | 10/2007 | Savicki, Jr. | |
| 7,724,557 B2 | 5/2010 | Ganta Papa Rao Bla et al. | |
| 7,850,322 B2 * | 12/2010 | Glazner et al. | 362/95 |
| 7,862,350 B2 | 1/2011 | Richter et al. | |
| 7,869,171 B2 | 1/2011 | Weeks et al. | |
| 8,629,617 B2 | 1/2014 | Richards et al. | |
| 2004/0218379 A1* | 11/2004 | Barton | 362/95 |
| 2008/0067052 A1* | 3/2008 | Glew | 200/600 |
| 2009/0284384 A1 | 11/2009 | Barton | |
| 2014/0077707 A1* | 3/2014 | Restrepo | H05B 37/0272 315/158 |

* cited by examiner

*Primary Examiner* — Tung X Le
(74) *Attorney, Agent, or Firm* — Dickinson Wright PLLC

(57) ABSTRACT

An electrical device such as a switch includes a light source and light sensor to detect ambient light and actuate the light source when the ambient light is below a predetermined level. The light switch has a pivotally mounted rocker actuator with a first outer face on one side of the pivot axis at a first end of the housing and a second outer face on a second side of the pivot axis at a second end of the housing. The light source is positioned in the housing to illuminate a light transmitting area of the first outer face of the actuator. The light sensor and a light sensor lens for directing ambient light to the light sensor are positioned at or near the second outer face at the second end of the housing.

22 Claims, 5 Drawing Sheets

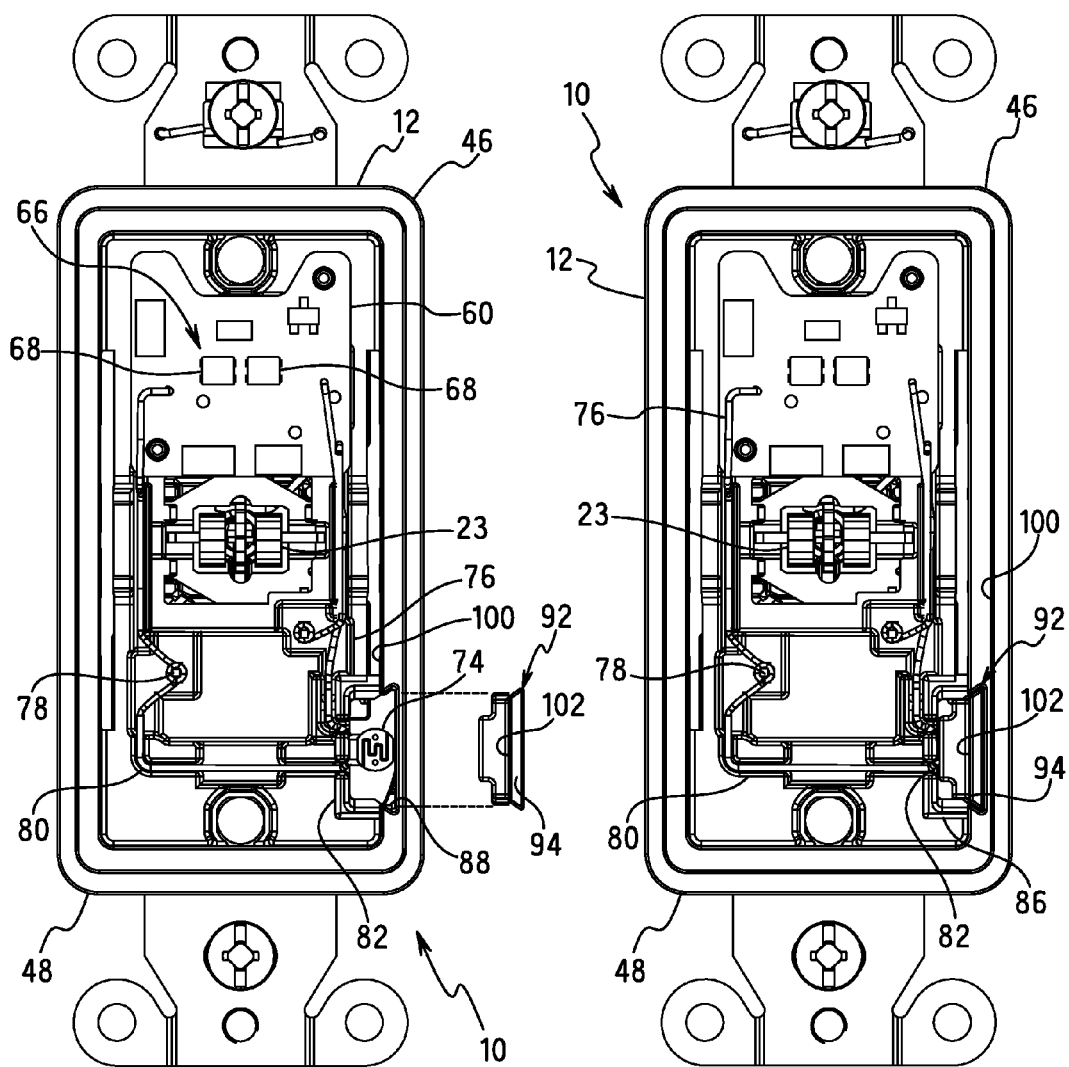

WALL SWITCH WITH NIGHTLIGHT

CROSS-REFERENCE TO RELATED APPLICATION

This application claims the benefit of U.S. Provisional application 61/781,589 filed Mar. 14, 2013, which is hereby incorporated by reference in its entirety.

FIELD OF THE INVENTION

The present invention is directed to an electrical wiring device and an electrical switch assembly, such as a wall switch, having a light source and a light sensor to actuate the light source at low ambient light levels. The invention is particularly directed to a wall switch where a portion of the rocker actuator of the switch is illuminated by a light source within the device when the ambient light level is below a threshold level.

BACKGROUND OF THE INVENTION

Various electrical devices have been proposed in the past for providing low level lighting to areas sufficient to enable to a person to walk safely around a room or other area without illuminating the entire area. Nightlights are a common example of a low level lighting devices that are often used in bathrooms, garages, stairwells or other common areas to provide lighting to enable a person to safely move about the area.

Nightlights are can be wired to remain illuminated continuously or can be provided with a switch to manually turn the light on when needed and off when lighting is not needed. Nightlights have also been constructed with a light sensor to activate the light at various light levels. These devices have the advantage of reducing energy by illuminating the light only when needed.

Electrical wiring devices such as wall switches and electrical receptacle have been proposed to illuminate the device to enable a person to easily locate the device in a dark room or area. Several of these devices include a light sensor to active the device at night or when the light is below a certain level. Examples of lighting devices that include a light sensor to activate the light are disclosed in U.S. Pat. No. 5,670,776 to Rothbaum and U.S. Pat. No. 3,084,239 to Horvath.

Other patents relating to LED lighted devices include U.S. Pat. No. 7,165,864 to Miller and U.S. Pat. No. 7,234,844 to Bolta et al. Electrical receptacles, GFCI circuits and switches having a light, such as an LED, are disclosed in U.S. Pat. No. 7,285,721 to Savicki, U.S. Pat. No. 7,862,350 to Richter et al. and U.S. Pat. No. 7,869,171 to Weeks et al.

While these prior devices have been generally suitable for the intended need, there is a continuing need in the industry for improved lighting devices.

SUMMARY OF THE INVENTION

The present invention is directed to an electrical wiring device and electrical switch assembly having a light source and a light sensor. The invention is particularly directed to an electrical wiring device having a load control assembly and a switch, such as a wall switch assembly having a light source and a light sensor to control the operation of the light source.

The switch assembly of the invention has a manually operated actuator to turn the electrical device or electrical load between an and on and off position. In one embodiment of the invention, at least a portion of the actuator can be illuminated to enable a person to locate the actuator of the switch assembly in a dark room or other dark area.

The switch assembly of the present invention includes a light sensor such as a photocell that can detect the light level in a room or other area to actuate a light mounted in the switch assembly when the light is below a predetermined level and to deactivate the light source when the ambient light is above a predetermined level.

One feature of the present invention is to provide an electrical wiring device having a load control assembly such as a wall switch assembly as a self-contained unit where the device has a light source and a light sensor to active the light source at predetermined times or at low ambient light levels. The light source is mounted within the switch housing to illuminate at least a portion of an actuator of the device.

Another feature of the invention is to provide an electrical switch assembly having a light source to illuminate the actuator of the switch assembly and a light sensor that is spaced from the light source a sufficient distance and/or is located in the switch assembly in an area where the light from the light source does not interfere with the light sensor to reduce the incidence of false readings and enable the light sensor to detect ambient light levels without interference with the light from the light source in the wall switch.

The switch assembly in one embodiment of the invention has a manually operated actuator such as a rocker or toggle type actuator where at least a portion of the surface of the actuator can be illuminated. The light sensor is preferably located on the housing of the switch assembly in area spaced from the illuminated portion so that the sensor is able to detect ambient light levels without interference from the illuminated portion.

In one embodiment of the invention, the switch assembly has a rocker or actuator with a first outer face area that is pushed or depressed by the user to an on position to activate the electrical load and a second outer face area that is pushed or depressed by the user to an off position to deactivate the external electrical load. One example of a switch assembly is referred to as a decorator style switch having a rocker type actuator with actuating surfaces that are depressed inward toward the housing of the switch rather than moving the switch in a up and down longitudinal direction. The decorator style switch has a rocker with a surface area that occupies a substantial portion of the visible area of the switch and typically at least 80%, and more preferably at least 90%, of the surface area of the front face of the switch assembly. In one embodiment of the invention, at least a portion the area of the actuating surface of the rocker is illuminated while the surface area of the rocker for turning the electrical load off is not illuminated. This enables the user to easily locate the actuating portion of the rocker to turn the electrical load on. The electrical load is typically a lighting fixture or luminaire.

The switch assembly of the invention has a housing supporting the various electrical components, electrical contacts and a user accessible actuator located in an opening formed in the housing. A light source is mounted within the housing to illuminate at least a portion of the actuator. A light sensor is provided in the housing at a location spaced from the illuminated portion of the actuator. The illuminated portion of the actuator can be located at a first end of the housing and the light sensor can be positioned at a second end of the housing opposite the first end. In a preferred embodiment of the invention, the light sensor is positioned along the edge of the opening in the front face of a side wall of the housing.

The switch assembly of the invention has a light sensor located within the housing and a light sensor lens functioning as a light pipe to conduct the ambient light to the light sensor.

The light sensor mounted in the housing is spaced from the light source to prevent light from the light source from being detected by the light sensor within the housing. In one embodiment, the housing can have a shield or other structure within the housing to block the light from the light source within the housing from the light sensor.

In one embodiment of the invention, the load control device is an electrical switch assembly such as a wall switch. The switch of the invention has a housing with an opening formed in the front face and toggle or rocker actuator mounted within the opening for movement between an on position and an off position. A light sensor lens is mounted in the front face of the housing to conduct ambient light to a light sensor mounted in the housing below the front face. In one embodiment the light sensor lens has longitudinal dimension greater than a width of the lens and extends in a longitudinal direction with respect to the housing next to or adjacent the opening in the front face. The light sensor lens can have a length of about 15% to about 25% of the length of the housing. The light sensor is electrically connected to a light source, such as an LED, to illuminate a portion of the toggle or rocker actuator.

The various features of the invention are attained by providing an electrical switch assembly comprising a housing having a side wall, a front face, an internal cavity, and a central opening surrounded by the front face. A switch is mounted in the housing for connecting to a power source to supply power to a load. The switch has a user accessible pivotally mounted actuator having a first outer face on a first side of a pivot axis of the toggle actuator and at a first end of the housing. The actuator has a second outer face of a second side of the pivot axis and at a second end of the housing. A light source is mounted in the housing and connected to the power source for illuminating the first outer face substantially without illuminating the second outer face. A light sensor is electrically connected to the light source and configured for detecting ambient light to actuate the light source when the ambient light is below a predetermined threshold level. A light sensor lens is mounted in the front face of the housing at the second end for directing ambient light to the light sensor.

These and other features of the invention are attained by providing an electrical switch assembly comprising a housing, a switch mounted in the housing, a light source, a light sensor and a light sensor lens associated with the light sensor. The housing has a side wall, a front face, an internal cavity, and central opening formed in the front face. The switch assembly is connected to a power source to supply power to a load. A pivotally mounted actuator has a user accessible portion positioned in the opening in the front face of the housing. The light source is mounted in the housing and is connected to the power source for illuminating at least part of the actuator. The light sensor is mounted in the housing for detecting ambient light and actuating the light source when the detected ambient light is below a predetermined threshold level. The light sensor lens is positioned in the front face for receiving ambient light and directing the ambient light to the light sensor.

The features of the invention are further attained by providing an electrical wiring device comprising a housing having a side wall, a front face, and a central opening formed in the front face. A user accessible electrical load control assembly is mounted in the housing and has an actuator accessible through the opening in the housing. The load control assembly has a light source connected to a power source for illuminating at least a part of the actuator at a first end of the housing. A light sensor is mounted in the housing for detecting ambient light through the front face of the housing for actuating the light source when ambient light is below a predetermined threshold level. The light sensor is spaced from the light source a distance of prevent false detection of the ambient light.

These and other objects, advantages and features of the invention will become apparent from the following detailed description of the invention, which in conjunction with the annexed drawings disclose various embodiments of the invention.

BRIEF DESCRIPTION OF THE DRAWINGS

The following is a brief description of the drawings in which;

FIG. 6 is a top view of the device with the rocker removed showing the light sensor with the lens removed;

FIG. 7 is a top view of the device with the light sensor lens mounted in the housing;

DETAILED DESCRIPTION OF THE INVENTION

Figure 1:
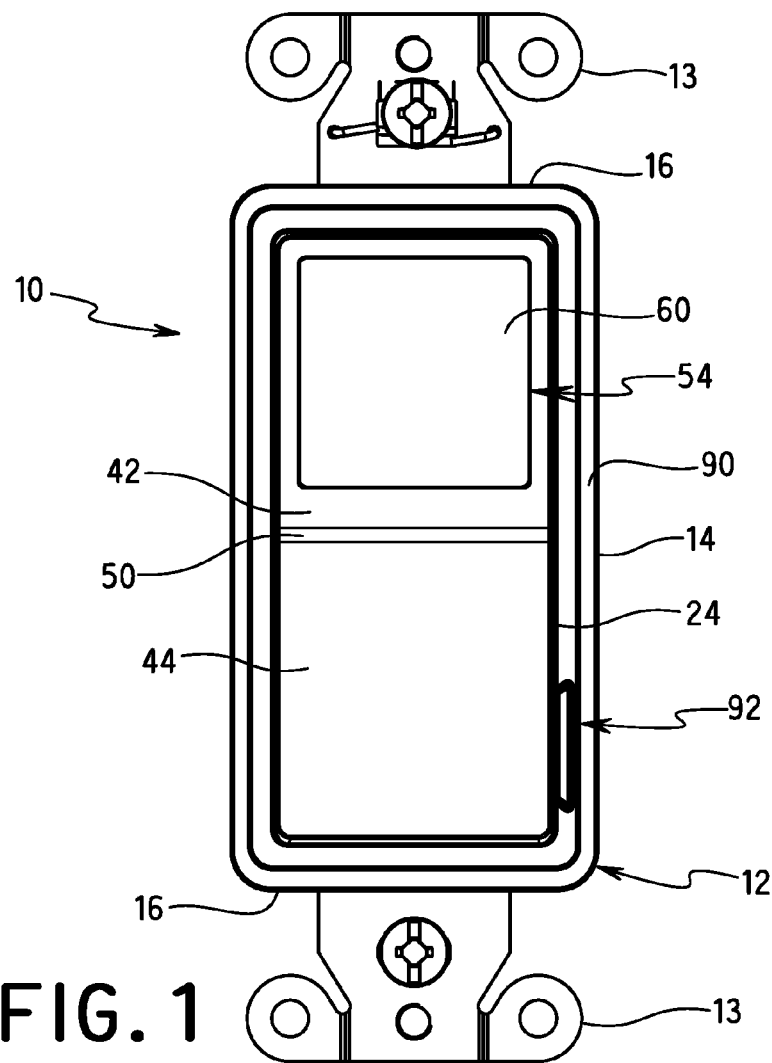
FIG. 1 is a front view of the electrical wiring device in one embodiment of the invention.

The present invention is directed to an electrical wiring device and electrical switch assembly and having a light source and a light sensor. The wiring device can be a number of different wiring devices as known in the art. In a preferred embodiment of the invention, the wiring device is a toggle type electrical switch assembly as shown in the drawings. The electrical switch assembly in the embodiment shown is a decorator style switch although other styles and constructions can be used. The device and switch assembly of the present invention has a load control assembly such as a switch connected to a power source for supplying power to an external load. The load is typically a lighting fixture or luminaire.

Referring to the drawings, the invention is a switch having a housing 12, a manually operated interface such as an actuator 24, a light source 66 for illuminating at least a portion of the actuator 24 and light sensor 74 operatively connected to the light source 66.

Figure 2:
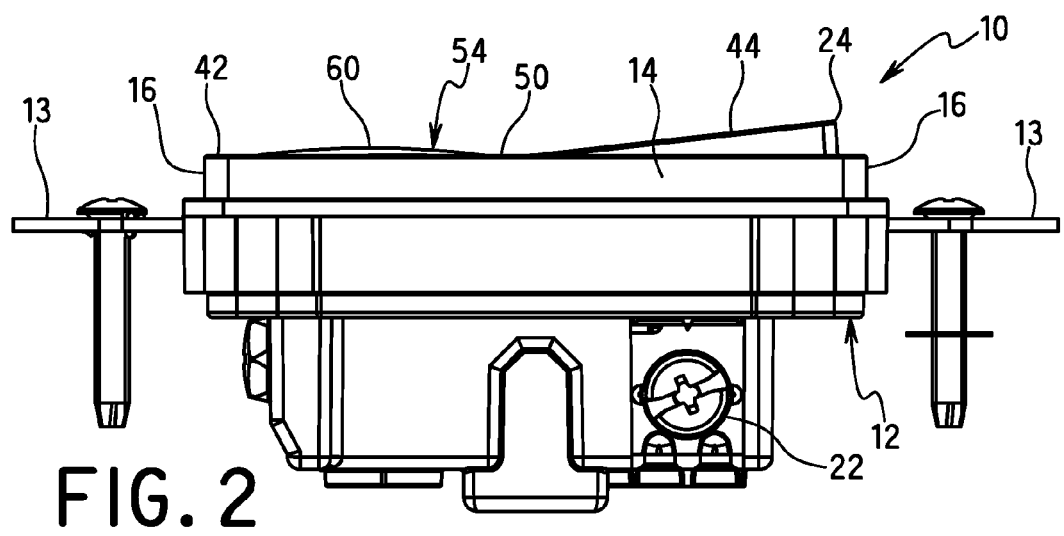
FIG. 2 is a side view of the device of FIG. 1.
Figure 5:
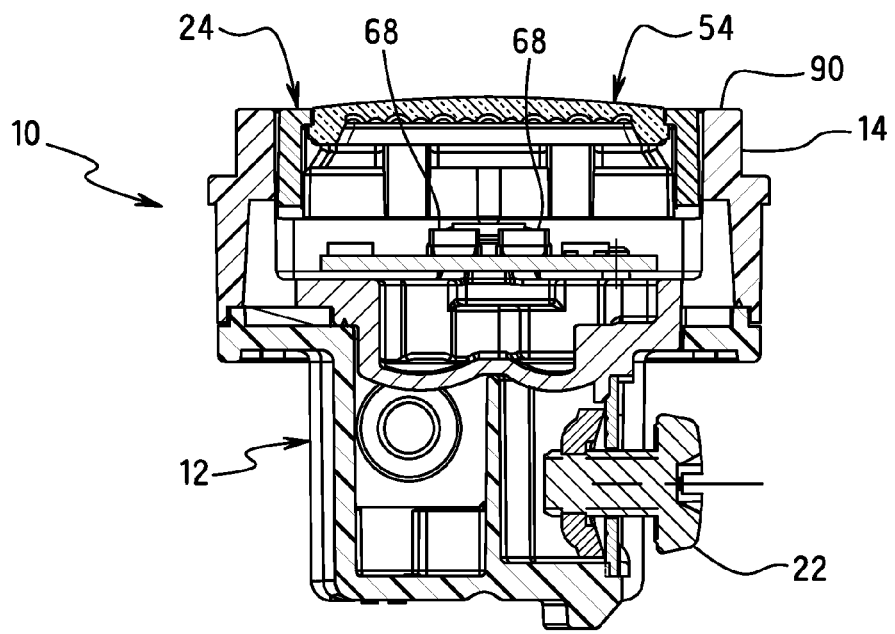
FIG. 5 is a cross sectional view taken along line 5-5 of FIG. 1.

In one embodiment, the invention is directed to a switch assembly having a light source within the switch housing and a light sensor for controlling the light source. Referring to the drawings, an electrical switch assembly 10 includes a housing 12 having a side walls 14 forming a front face 90 of the housing 12 and having a central opening 18. The housing 12 has mounting straps 13 and an internal cavity 20 for supporting the electrical contacts, wiring, switching mechanisms and the like. The electrical connectors 22 as shown in FIGS. 2 and 5 are provided for connecting the switch 10 to an electrical power source as known in the art. The electrical contacts and internal components 23 of the switch can be standard components as known in the art. One example of a suitable switch assembly is disclosed in U.S. Pat. No. 8,242,401 which is hereby incorporated by reference in its entirety.

The switch 10 of the invention is a constructed for mounting in a standard electrical box for supplying and controlling power to an external load or electrical device such as a light fixture, luminaire, ceiling fan or the like. In one embodiment, the switch is a decorator style switch having a substantially rectangular configuration although other switch designs and shapes are suitable. The decorator style switch is defined by the rocker actuator having a low profile compared to a standard toggle type switch that projects outward from the front face 90. The rocker actuator occupies a substantial portion of the surface area of the front face of the device. The opening in the housing typically is defined by the side wall so that the front face of the housing is formed by the top surface of the side wall and the front face forms a narrow perimeter or frame around the rocker actuator. The low-profile of the rocker is pivoted between the positions by pushing the opposite ends of the rocker in an inward direction with respect to the housing 12.

Figure 3:
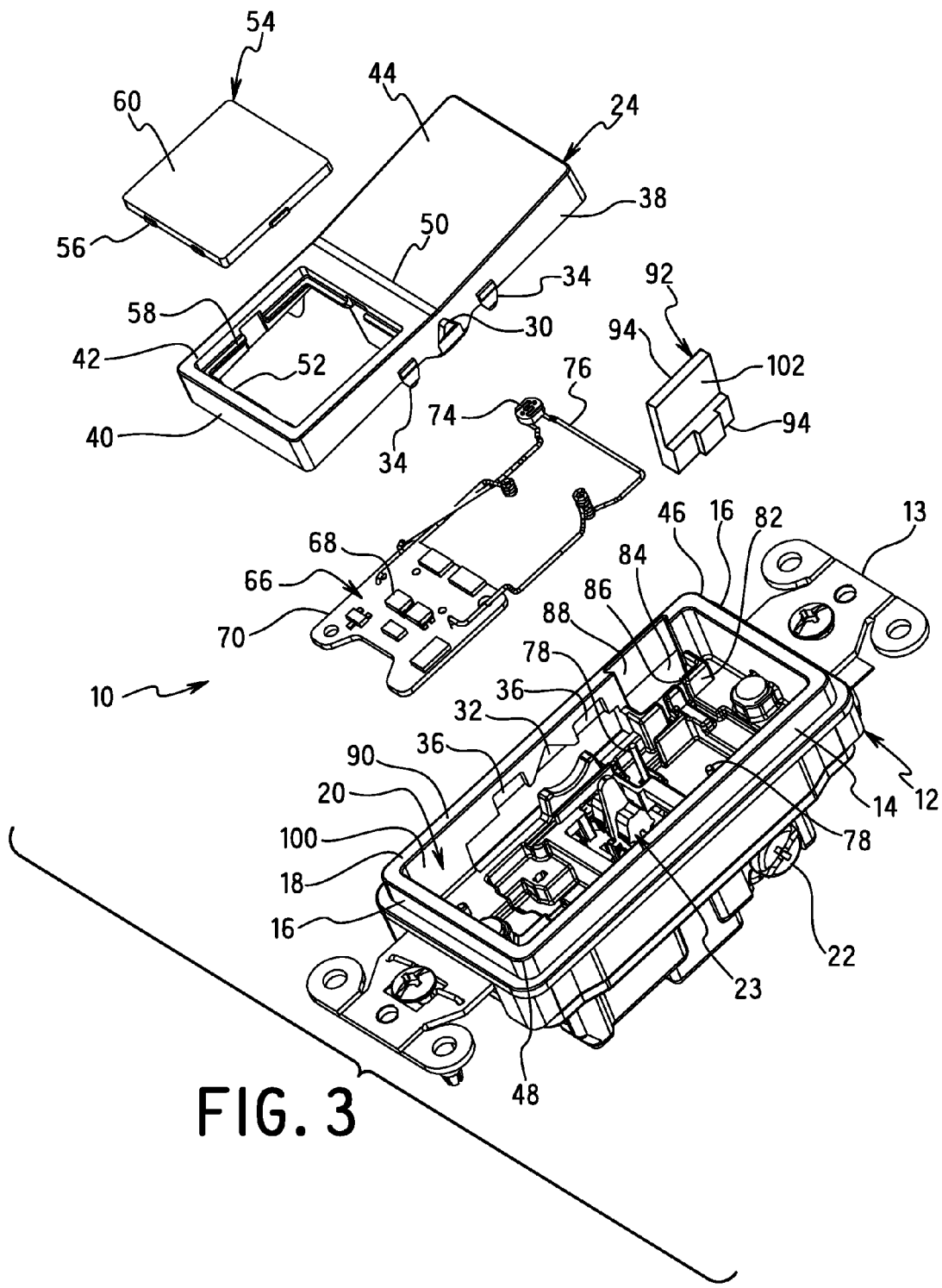
FIG. 3 is an exploded view of the device of FIG. 1.
Figure 8:
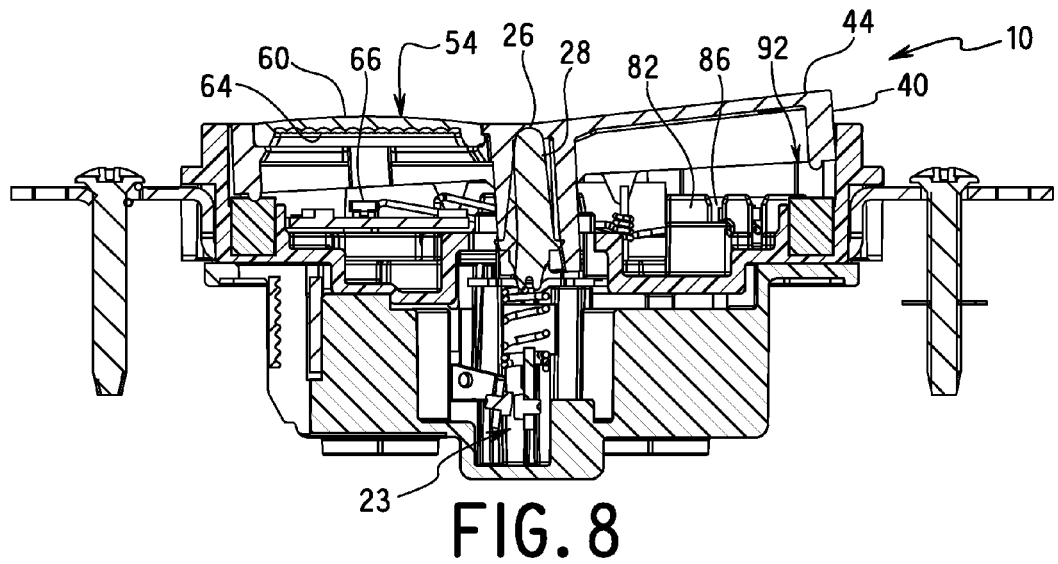
FIG. 8 is a cross sectional side view of the device of FIG. 1.

Referring to FIGS. 3 and 8, the switch 10 includes a pivotally mounted actuator shown as a manually operated rocker 24 mounted in the housing 12 to reciprocate about a pivot axis 26 between an on position and an off position. The rocker 24 pivots about a rocker arm 28 and actuates the electrical contacts to supply power to the load in the on position. The actuator is shown and described herein as a rocker although other forms of actuators can be used.

Figure 4:
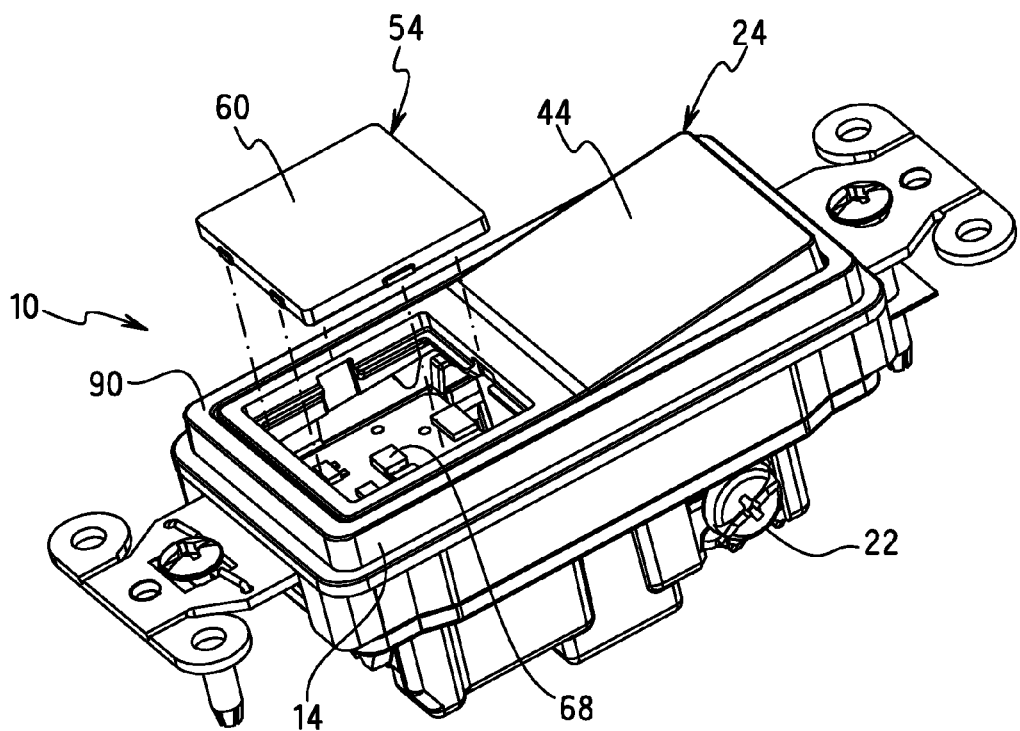
FIG. 4 is a perspective view of the device.

As shown in FIGS. 3 and 4, the rocker 24 has a center pivot axis 26 defined by the rocker arm 28. The rocker 24 includes a centrally located tab 30 on each side that extends outwardly and couples with a corresponding central recess 32 in the opposite side walls 14 of the housing 12 along the pivot axis 26. Detents 34 are provided on the sides of the rocker 24 on opposite sides of the tabs 30. The detents 34 are received in corresponding recesses 36 in the respective side wall 14 of the housing 12 to limit the pivoting movement of the rocker 24 and retain the rocker in the open end of the housing.

The rocker 24 has side walls 38, end walls 40, a top wall forming a first outer face 42 and a second top wall forming a second outer face 44. As shown, the rocker 24 has a substantially rectangular configuration. The rocker 24 has a dimension to be received in the opening 18 of the housing 12 for reciprocating or rocking between an on position and an off position of the switch. The first outer face 42 and the second outer face 44 are formed at an incline with respect to each other so that each surface is able to be substantially flush with the front face 90 of the side walls 14 and end wall 16 when the respective portion is depressed to actuate the switch. The first outer face 42 and the second outer face 44 are inclined to form a substantially V-shaped top surface and converge to an apex 50 aligned with the pivot axis 26.

The rocker 24 defines a pivotally mounted actuator for operating the switch assembly as known in the art. The first outer face 42 of the rocker 24 is formed on a first side of the pivot axis 26 at a first end 46 of the housing 12. The second outer face 44 of the rocker 24 is formed on a second side of the pivot axis 26 at a second end 48 of the housing 12 opposite the first end 46. In the embodiment shown, the first outer face 42 and second outer face 44 occupy a substantial portion of the front face of the switch and the opening 18 in the housing 12.

In one embodiment, the rocker 24 is made from an opaque plastic material or other material that does not transmit light. The second outer face 44 as shown has a substantially solid or continuous flat outer surface. The first outer face 42 has a light transmitting area that is able to be illuminated by an internal light source 66 to be visible by the user at low ambient light levels. In the embodiment shown, the first outer face 42 has an opening 52 for receiving a light transmitting member such as a rocker lens 54 forming the light transmitting area for transmitting light and illuminating the first outer face 42. The rocker lens 54 can be made from a clear or translucent plastic material that can be snapped into the opening 52 by tabs 56 on the outer edges of the lens 54 that are received in corresponding recesses 58 on the inner edge of the opening 52 of the rocker 24.

Figure 9:
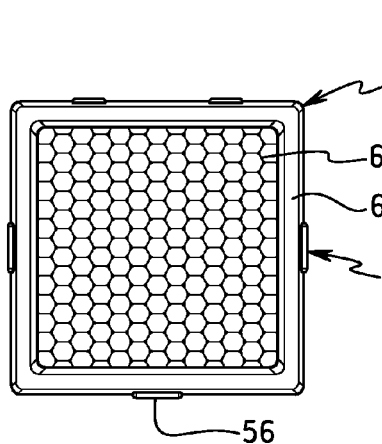
FIG. 9 is bottom view of the lens for illuminating the device.
Figure 10:
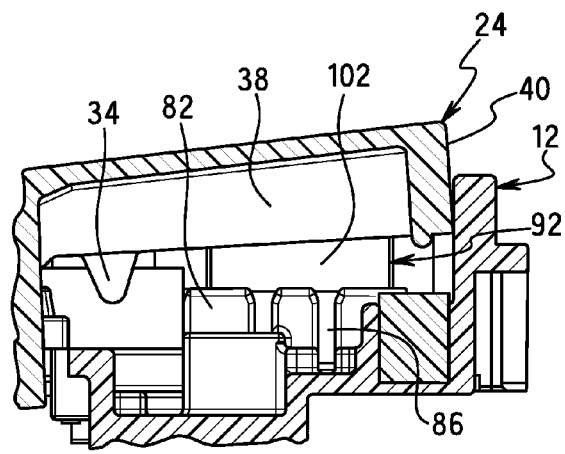
FIG. 10 is a partial cross sectional view showing the location of the light sensor in the housing.

As shown in FIGS. 5 and 6, the lens 68 can have a substantially smooth outer top face 60. The bottom inner face 62 of the lens 54 as shown in FIG. 9 can have a plurality of dimples 64 or convex lens forming surfaces for focusing and diffusing the light and illuminating the first outer face 42 of the switch. As shown in FIG. 8, the outer top face 60 of the lens 54 can have a slight convex crown to protrude slightly above the edge of the first outer face 42 of the rocker 24. The convex crowned outer surface of the lens enables the lens to be visible from the side to enable the user to locate the switch at low light levels.

The light source 66 can be at least one and typically two LEDs 68 forming an LED array mounted on a circuit board 70. The circuit board 70 can be electrically connected to the power source of the switch and is provided with suitable circuitry such as diodes, resistors, transistors and the like to actuate the LEDs. The circuit board can have standard components as known in the art for actuating and illuminating the LEDs 68. The circuit board 70 is mounted in the cavity of the housing 12 below the rocker 24. The LEDs 54 when activated project light toward the rocker 24 to illuminate the lens 68 to assist a person in locating the switch when the room or area is dark. In a preferred embodiment as shown, the circuit board 70 is mounted in the housing below the first outer face 42 of the rocker 24 on the first side of the pivot axis toward the first end 46 of the housing 12. The LEDs preferably provide sufficient light to illuminate the rocker 24.

The circuit board 70 can be mounted in the housing by conventional means such as by clips, prongs or adhesives. In a preferred embodiment, the circuit board 70 is mounted at the first end 46 of the housing 12 directly below the first outer face 42 of the rocker 24 in a substantially horizontal position parallel to the bottom wall of the housing 12. In the embodiment shown, the circuit board 70 has a dimension to fit within the area on one side of the pivot axis 26 of the rocker 24. As shown, the LEDs 68 are positioned on the circuit board 70 to project light towards the rocker lens 54 in an outward direction from the open front 18 of the housing 12. The number of LEDs can vary depending on the dimensions of the rocker and the desired level of illumination. Preferably, the LEDs 68 illuminate the lens 54 and the first outer face 42 of the rocker 24 with sufficient intensity to enable a user to easily locate the rocker 24 and the switch 10 in the dark and at low light levels.

In one embodiment of the invention, the first outer face 42 of the rocker 24 that is illuminated is pushed or depressed to flip the rocker and the electrical contacts to the on position to supply electrical power to the load. In this manner, the user is able to easily determine the correct area or portion of the rocker 24 to be depressed at low light levels to turn the switch to the on position. Typically the switch is connected to a light to enable the user to turn the light on when the user might otherwise have difficulty locating the switch when the room or area is dark.

A light sensor 74 in the form of a photocell is provided to detect the ambient light in the area of use and to actuate the LEDs 68 when the ambient light is below a threshold level thereby illuminating the rocker 24 and enabling the rocker 24 to be visualized or seen in a dark area by the user. The light sensor 74 is electrically connected to the circuit board 70 by hot and neutral wires 76 as shown in FIGS. 4 and 5 to operate the LEDs. The circuitry of the light sensor 74 can use a conventional wiring schematic as known in the art to activate the LEDs and illuminate the lens of the rocker. The circuit can be configured to turn the LEDs off when the rocker is moved to the on position. Typically, the switch is used with a lighting assembly or luminaire so that the light from the luminaire is sufficient to activate the light sensor and deactivate the LEDs when the room or area is illuminated, thereby increasing the ambient light level.

The wires 76, as shown in the FIGS. 6 and 7, extend between the circuit board 70 and the light sensor 74 through the cavity of the housing 12 below the rocker 24. Each of the wires 76 are wrapped around a pin 78 which is integrally formed with the housing or separate element that is inserted into a corresponding hole in the housing 12 to retain the wires in place. The wires 76 can be wrapped around the respective pin tightly to retain the wires within the housing 12. Various wire channels 80 can be formed in the housing 12 to receive the wires 76 and hold the wires in place.

The light sensor 74 is mounted in the housing at a location remote from the rocker lens 54 and the LED 68 to minimize the interference from the light emitted from the LEDs 68 when detecting the ambient light conditions. As shown in FIGS. 5 and 6 the light sensor 74 can be mounted in the housing 12 along one side wall 14 near a corner at the second end 48 of the housing 12. Alternatively, the light sensor 74 can be mounted along the end wall 16 opposite the rocker lens 54 and the LEDs.

In one preferred embodiment of the invention, the light sensor 74 is located in the housing in a region below the second outer face 44 of the rocker 24 on a side of the pivot axis of the rocker opposite the LEDs 68 or other light source. The electrical contacts and components of the switch mechanism are generally located in the center area of the housing to shield the light sensor 74 from the LEDs 68. In one embodiment, a wall or partition can be provided in the housing to shield the light sensor 74 from incident light from the LEDs 68.

In the embodiment shown, the light sensor 74 is positioned on the longitudinal side wall 14 at or toward the second end 48 of the housing 12 of the housing below the second outer face 44 of the rocker 24. Preferably the light sensor 74 is positioned at the end of the side wall 14 next to or proximate the second end 48 to space the light sensor from the LEDs. As shown, the housing 12 is formed with a wall 82 extending from the bottom of the housing 12 a distance to form a chamber 84 for receiving the light sensor 74. The wall 82 is provided with narrow slots 86 for the wires 76 extending between the light sensor 74 and the circuit board 70. The wall 82 preferably has a height to shield the light sensor from stray light from the LEDs within the housing.

In the embodiment shown, a recess 88 is formed on the inner surface 100 of the side wall 14 of the housing 12 as shown in FIG. 3 for receiving at least a portion of the light sensor 74. The recess 88 extends to the front face 90 of the side wall 14 to form an opening in the front face 90 for receiving a light sensor lens 92. The light sensor 74 is positioned below the front face 90 of the side wall of the housing 12 with the light sensor lens 92 extending between the front face 90 of the housing 12 and the top surface of the light sensor 74.

As shown in FIG. 1, the light sensor lens 92 is positioned at the front face 90 of the side wall 14 of the housing 12 next to the second outer face 44 of the rocker 24. The front face 90 of the housing 12 has a dimension to fit within the opening of a corresponding face plate. In the embodiment shown, the light sensor lens 92 has a flat outer top face 94 that is preferably flush with the front face 90 of the side wall of the housing 12. The light sensor lens 92 has a body with the outer top face 94 aligned with the top face 90 of the housing 12 and an inner bottom face 96 that mates with the photocell or light sensor 74. The light sensor lens 92 functions as a light pipe to carry the ambient light from the front face 90 of the housing 12 to the light sensor 74.

Figure 11:
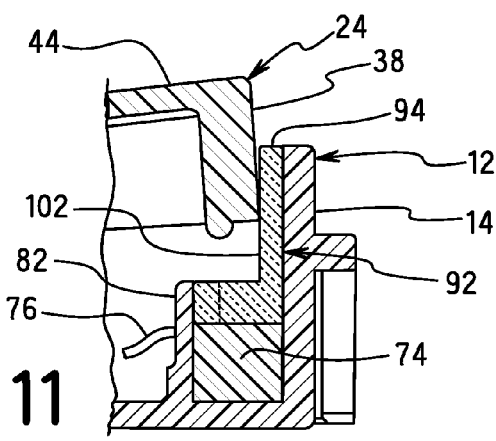
FIG. 11 is an enlarged end view of the light sensor and lens mounted in the housing.

As shown in FIGS. 3 and 11 the bottom face 96 of the light sensor lens 92 has a width to mate with the light sensor 74 that is wider than the top face 94. The body of the light sensor lens 92 has a width to be received in the recess 88 in the side wall 14 of the housing so that the side surface 102 of the light sensor lens 92 is flush with the inner surface 100 of the side wall 14 to avoid interference with the movement of the rocker 24. In one embodiment the recess 88 in the housing 12 has a substantially dovetail shape and the light sensor lens 92 has a complementary shape to couple the light sensor lens 92 to the side wall 14.

The light sensor 74 and the corresponding light sensor lens 92 can be positioned in various locations where the light from the LEDs does not interfere with the detection of the ambient light. Preferably the light sensor lens 92 is provided on the front face 90 of the side wall 14 of the housing 12 and is exposed through the face plate next to, near or contiguous with the inner edge and the rocker 24.

The light sensor lens 92 has a longitudinal length sufficient to capture ambient light to activate the light sensor 74 and actuate the LEDs 68. The light sensor lens 92 can have a longitudinal length that is not more than about ½ the length of the second outer face 44 of the rocker 24. In another embodiment, the light sensor light sensor lens 92 has a longitudinal length not more than about ⅓ the length of the second outer face 44 of the rocker 24. The light sensor lens 92 can also have a longitudinal length of about 15% to 25%, and preferably about 18% of the longitudinal length of the housing 12. The light sensor lens 92 generally has a width of about 80% of the front face of the housing 12 that is visible through the face plate opening during normal use.

In other embodiments of the invention, the light sensor lens 92 can have a front face spanning the width of the front face 90 of the side wall 14 of the housing. The light sensor lens 92 preferably is made of a transparent plastic material to function as a light pipe to direct the ambient light from the front face 90 of the side wall 14 of the housing directly to the light sensor 74. In the embodiment shown, the light sensor lens 92 has a substantially flat top face 94 aligned with the front face 90 of the side wall. In other embodiments, the top face of the light sensor lens has a concave surface forming a lens to focus the ambient light to the light sensor 74.

During use, the light sensor detects the ambient light level in the area of the switch and actuates the LEDs when the light is below a threshold level. The LEDs illuminate the lens of the rocker 24 so that the switch is visible under low light environments. During daylight hours or when the ambient light is above the threshold levels, the light sensor deactivates the LEDs. For example, the switch can be electrically connected to a light fixture such that when the switch and light fixture are in the off position, the LEDs are actuated to illuminate the rocker. By turning the switch on to actuate the light fixture, the light level increases above the threshold level to deactivate the LEDs.

While various embodiments of the invention have been chosen to illustrate the invention, it will be understood that various changes and modifications can be made without departing from the scope of the invention as defined in the appended claims.

What is claimed is:

1. An electrical switch assembly comprising:
a housing having a side wall, a front face, an internal cavity, and a central opening surrounded by said front face;
said switch assembly configured for connecting to a power source to supply power to a load, said switch assembly having a user accessible pivotally mounted actuator projecting through said central opening, said actuator having a first outer face on a first side of the pivot axis and at a first end of said housing, and a second outer face on a second side of the pivot axis at a second end of said housing;
a light source mounted in said housing for illuminating said first outer face substantially without illuminating said second outer face, said light source having an electrical circuit connected to the power source;
a light sensor electrically connected to said light source for detecting ambient light and being configured for actuating said light source when said ambient light is below a predetermined threshold level; and
a light sensor lens in said front face of said housing at said second end of said housing for directing ambient light to said light sensor.

2. The assembly of claim 1, wherein
said front face is formed by said side wall and has a recess, and where said light sensor lens is received in said recess, and said recess in said front face is formed along an inner edge of said side wall defining said central opening, and where said light sensor lens has a side surface facing said central opening; and
said light sensor lens has an outer face associated with said front face and an inner face associated with said light sensor for directing ambient light directly to said light sensor.

3. The assembly of claim 1, wherein
said light source comprises a circuit board mounted in said housing and at least one LEDs mounted on said circuit board, said at least one LED being position below said first face of said toggle actuator, and where said light sensor is electrically connected to said circuit.

4. The assembly of claim 3, wherein
said first face of said actuator has an opening and a lens mounted in said opening, said lens having an inner face positioned to receive light from said LED and an outer face to project light from the LED.

5. The assembly of claim 4, wherein
said lens of said actuator occupies at least 75% of the surface area of said first outer face, and where said second outer face is opaque.

6. The assembly of claim 5, wherein
said lens of said actuator in said first outer face has a substantially square configuration.

7. The assembly of claim 1, wherein
said at least one portion of said first outer face of said actuator has a light transmitting area to emit light from said light source, and where said second outer face is substantially opaque.

8. The electrical assembly of claim 1, wherein said front face of said housing has a recess, and where said light sensor lens is received in said recess in said front face.

9. An electrical switch assembly comprising:
a housing having a side wall, a front face, an internal cavity and a central opening formed in said front face, a switch mounted in said housing for connecting to a power source for supplying power to a load, said switch having a user accessible actuator positioned in said opening in said front face;
a light source mounted in said housing and being connected to said power source for illuminating at least part of said actuator;
a light sensor mounted in said housing for detecting ambient light and actuating said light source when the detected ambient light is below a predetermined threshold level; and
a light sensor lens positioned in said front face of said housing for receiving ambient light and directly the ambient light to said light sensor.

10. The assembly of claim 9, wherein
said actuator has a first outer face at the first end of said housing and having a light transmitting area, and a second outer face at a second end of said housing, wherein said second outer face is opaque.

11. The assembly of claim 10, wherein
said actuator is a rocker switch having a pivot axis at a center of said housing and where said first outer face is on a first side of said pivot axis and said second outer face is on a second side of said pivot axis and where said first outer face has an open portion and a light transmitting lens received in said open portion and coupled to said first outer face, said lens having an inner face receiving light from said light source and an outer face for projecting light and illuminating said first outer face.

12. The assembly of claim 11, wherein
said light source includes a circuit board mounted in said housing and connected to said electrical power source, and at least one LED mounted on said circuit board for projecting light through said first outer face of said actuator, and where said light sensor is connected to said circuit board to actuate said LED when the ambient light is below the threshold level.

13. The assembly of claim 9, wherein
said side wall of said housing has an inner face defining said central opening, said inner face having a recess and where said light sensor lens is mounted in said recess.

14. The assembly of claim 13, wherein
said light sensor lens has an outer face at said front face of said housing for capturing ambient light, and an inner face associated with said light sensor for projecting ambient light to said light sensor, and where said inner face has a surface area greater than a surface area of said outer face, and said outer face of said light sensor lens has a length extending in a longitudinal direction of said wall and a width less than said length and less than a thickness of said side wall.

15. The assembly of claim 9, wherein
said actuator has a first outer face at a first end of said housing and a second outer face at a second end of said housing, said light source being positioned in said housing to illuminate said first outer face of said actuator, and
said light sensor lens is mounted in a recess formed in said side wall at said second end of said housing.

16. An electrical wiring device comprising:
a housing having a side wall, a front face and a central opening formed in said front face;
a user accessible electrical load control assembly mounted in said housing and having an actuator accessible through said opening in said housing, said wiring device having a light source connected to a power source for illuminating a portion of said actuator at a first end of said housing; and
a light sensor mounted in said front face of said housing at a second end of said housing opposite said first end for detecting ambient light through said front face of said housing for actuating said light source when the ambient light is below a predetermined threshold level, and where said light sensor is spaced from said light source a distance to prevent false detection of the ambient light.

17. The electrical assembly of claim 16, wherein said load control assembly is an electrical switch having actuator pivotally mounted in said housing about a pivot axis, said actuator having a first outer face on a first side of said pivot axis and a second outer face on a second side of said pivot axis, and where said light source illuminates said first outer face.

18. The electrical assembly of claim 17, wherein said first outer face has a light transmitting member, and where said light source is position below said first outer face to project light through said light transmitting member, and where said second outer face is substantially opaque, and where said light transmitting member is a light transmitting lens having an inner face forming a lens for receiving light from said light source and an outer face for projecting light from said light source.

19. The electrical assembly of claim 18, wherein said light source includes a circuit board connected to said power source, at least one LED mounted on said circuit board, and where said light sensor is operatively connected to said circuit board.

20. The electrical assembly of claim 19, wherein said front face of said housing includes a light sensor lens at said second end of said housing for receiving ambient light and directing said ambient light to said light sensor, said light sensor lens having an outer face with a longitudinal dimension extending in a longitudinal dimension of said side wall and having a side face forming said central opening, and where said light sensor lens has an inner face with a dimension complementing a dimension of said light sensor and optically connected to said light sensor and a surface area greater than a surface area of said outer face.

21. The electrical assembly of claim 20, wherein said side wall of said housing defines said front face of said housing, said side wall extending between said first outer face of said actuator and said second outer face of said actuator, said light sensor lens being coupled to said side wall adjacent said second outer face of said actuator.

22. The electrical wiring device of claim 16, wherein said front face of said housing has a recess, and where said light sensor includes a light sensor lens received in said recess in said front face.

\* \* \* \* \*